United States Patent [19]

Wiacek

[11] 4,041,211
[45] Aug. 9, 1977

[54] PRODUCTION OF ZINC-AIR BUTTON CELL
[75] Inventor: Marian Wiacek, Montreal, Canada
[73] Assignee: Unican Electrochemical Products Ltd., Montreal, Canada
[21] Appl. No.: 620,107
[22] Filed: Oct. 6, 1975
[51] Int. Cl.² .............................................. H01M 2/08
[52] U.S. Cl. ...................................................... 429/36
[58] Field of Search ............... 136/86 A, 133; 429/82, 429/34, 35, 36

[56] References Cited
U.S. PATENT DOCUMENTS

| 3,713,896 | 1/1973 | Feldhake | 136/133 |
|---|---|---|---|
| 3,746,580 | 7/1973 | Aker et al. | 136/86 A |
| 3,791,873 | 2/1974 | Angelovich | 136/133 |
| 3,852,115 | 12/1974 | Lewis | 136/133 |
| 3,922,178 | 11/1975 | Winger | 429/82 |

Primary Examiner—John H. Mack
Assistant Examiner—H. A. Feeley
Attorney, Agent, or Firm—Max Geldin

[57] ABSTRACT

An improved substantially leak-proof button cell, particularly adapted for use in hearing aids, comprising an outer cathode can and an inner anode can containing a zinc electrode material, preferably a zinc paste, the inner can being positioned within the outer can, with the outer wall of the inner can spaced from the inner wall of the outer can, a polymeric seal, preferably a polypropylene seal, positioned between the outer wall of the inner can and the inner wall of the outer can, the outer wall of the inner can having a coating of an alkali resistant elastomer or elastomeric adhesive, e.g. a self-curing butyl elastomer modified by a phenolic resin, which is pressure sensitive and having the property of deforming when subjected to pressure without cracking or forming voids, a catalyst electrode on a flexible and permeable, preferably polytetrafluoroethylene, membrane and including a current collector, positioned between the polymeric seal and the inner wall of the outer can, and a separator between the zinc electrode material and the catalyst electrode. The outer wall of the inner can preferably is provided with a locking means such as a flange, to lock the seal onto such wall, and the seal, also coated with the above elastomeric adhesive, is preferably tapered downward and forms a leak-proof seal with the inner wall of the outer can, a collector mesh or wire from the catalyst electrode being exposed in contact with the inner wall of the outer cathode can.

29 Claims, 8 Drawing Figures

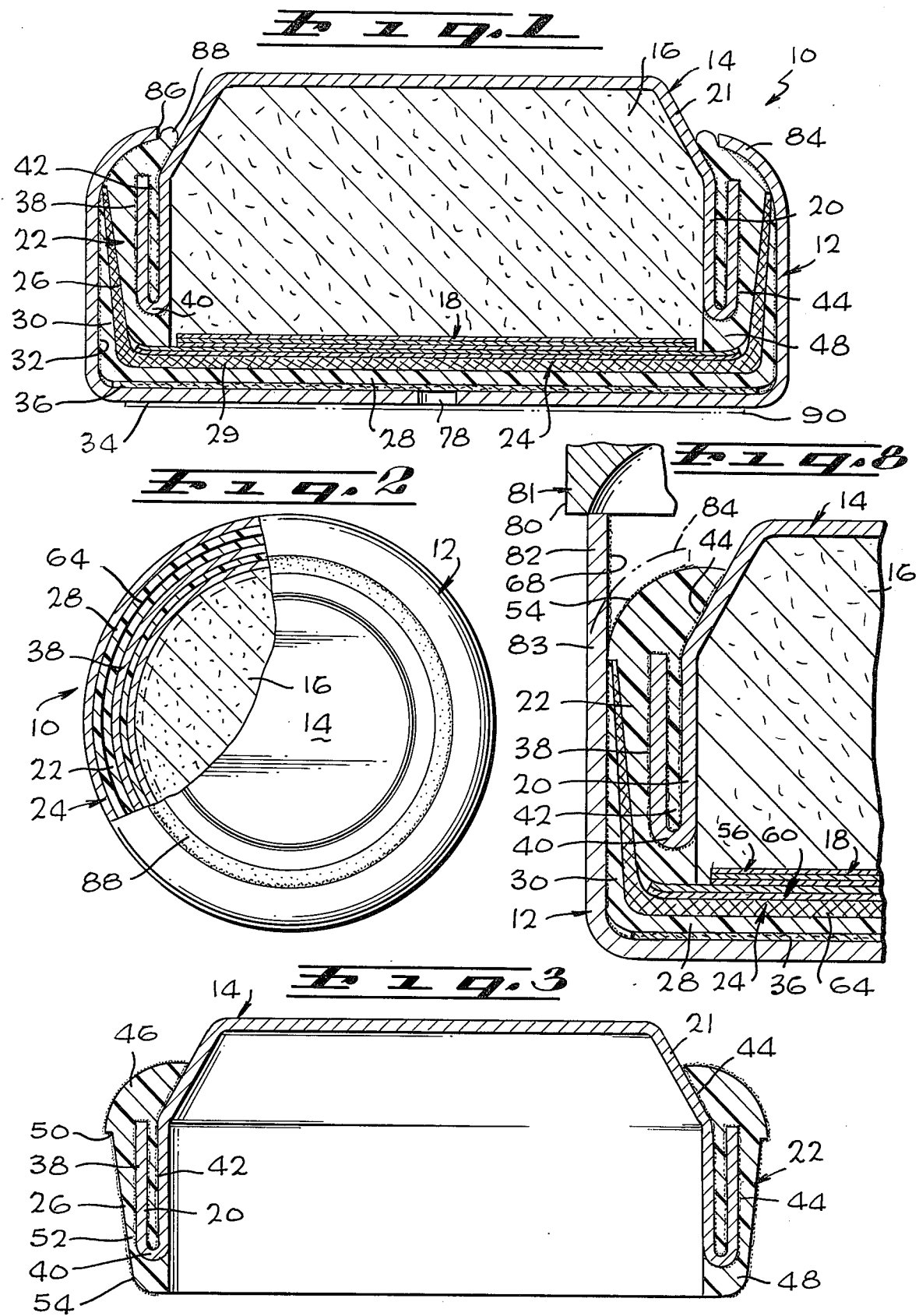

PRODUCTION OF ZINC-AIR BUTTON CELL

BACKGROUND OF THE INVENTION

This invention relates to zinc-air button cells, and is particularly concerned with the production of a substantially leak-proof zinc-air button cell embodying a novel sealing arrangement which substantially prevents or minimizes leakage of electrolyte, and which also results in minimal hydrogen evolution, such cells having extended storage life substantially without loss of efficiency, and exhibiting substantially no pressure buildup even when the cell is completely sealed. The invention is also concerned with a method of fabrication of such improved zinc-air button cells.

Zinc-cell cells employed as power sources are known. Such cells are constructed of a zinc electrode and a catalyst or air electrode, with a separator positioned between the zinc electrode and the catalyst electrode, the cell containing electrolyte such as aqueous potassium hydroxide, which permits electrolyte ions to pass or be conducted through such separator but prevents electrode ions from migrating through such separator or membrane.

The sealing of zinc-air cells of the above general type is essentially a problem of providing an efficient seal which prevents any electrolyte creapage outwardly from the zinc anode material and the separator along the internal surfaces of the can or housing for the cell components. For this purpose such can surfaces must be rendered non-gassing when in contact with electrolyte and zinc, and any plastic seal employed must exert sufficiently large pressure to combat any electrolyte creapage by capillary action along the microscopic channels present on the metal can surfaces.

However, any pressure of a magnitude which will aid in sealing the anode side of the cell in most cases will create a leak path along the cathode seal. Polytetrafluoroethylene (PTFE) membranes which generally form the hydrophobic barrier usually employed in zinc-air systems, are dimensionally unstable under substantial pressure and such excessive pressures will destroy the permeability and render futile any attempt to seal the metal surfaces. On the other hand, any relaxation of such pressure creates capillary conditions permitting electrolyte to undesirably creap along the cathode can surface.

Creapage of electrolyte along surfaces with negative potential is characterized by hydrogen evolution on such surfaces. The gas bubbles tend to lift the seal and allow electrolyte to wet more of the surface on which in turn gas bubbles will form and allow electrolyte to penetrate even further.

In addition to the problem of providing a non-leaking zinc-air cell, there is also the problem of storage and active life during continuous or intermittent discharge. Prior art zinc-air cells exhibit a tendency to rapid deterioration when exposed to air. This deterioration often is due to the combined effect of rapid carbonation of the cathode, and premature oxidation of the zinc anode.

Accordingly, one object of the invention is to provide a substantially leak-proof metal-air cell, particularly a button cell designed for use in hearing aids. Another object is the provision of a substantially leak-proof zinc-air button cell for the above purpose. Another object is to provide a button cell as noted above, particularly a zinc-air cell, including a novel sealing arrangement substantially preventing a leakage of electrolyte from the anode can of such button cell. Yet another object is to minimize gas, particularly hydrogen, evolution from the cell and to prevent pressure buildup when such cell is completely sealed. A further object is to provide a zinc-air cell having the above characteristics and which can be stored over relatively long periods of time with minimum loss of efficiency and capacity. A still further object is to provide relatively simple procedure for fabricating such improved, particularly zinc-air, button cells.

DESCRIPTION OF THE INVENTION

The above objects and advantages are achieved according to the invention by providing a button cell construction formed of an inner anode can positioned within an outer cathode can, the anode can containing an anode material, particularly zinc anode material, a catalyst electrode, particularly of a flexible nature, within the cathode can and in electrical contact therewith, and a separator between the zinc electrode material and the catalyst cathode, and incorporating a polymeric seal, preferably a polypropylene seal, between the outer wall of the inner anode can and the inner wall of the outer cathode can, with the wall of the inner can in contact with the seal being coated with an alkali, e.g. potassium hydroxide, resistant pressure sensitive material, preferably an elastomer or elastomeric adhesive, having the property of deforming when subjected to pressure without cracking or forming voids, and providing a substantially continuous seal. Preferably, the outer surface of the polymeric seal in contact with the inner wall of the cathode can and with a portion of the catalyst electrode, is also coated with such KOH resistant elastomer.

Preferably, a polymeric seal is employed which has a long outer sealing surface, and which is also tapered downwardly so that by pressing the assembly of the anode can containing the polymeric seal, the separator and the flexible catalyst electrode downwardly into the cathode can, the tapered polymeric seal progressively increases pressure along a large sealing area and compresses the flexible catalyst cathode between the seal and the wall of the outer can, providing a long and large sealing area between the polymeric seal and the catalyst electrode and inner wall of the outer can.

Of particular significance, during such compressing operation the elastomer coating or adhesive on the outer wall of the anode can and over which the polymeric seal is positioned, deforms or creaps under the pressure exerted against the assembly without forming any cracks and voids, and thus seals the anode can particularly against leakage of electrolyte from the separator and anode material within the anode can. Also, in preferred practice wherein the outer surface of the polymeric seal as well as the inside surface of the outer cathode can are also coated with the above noted potassium hydroxide resistant pressure sensitive or elastomeric adhesive coating, described in greater detail hereinafter, the formation of cracks and voids is prevented between the polymeric seal and the catalyst electrode as well as between the inner surface of the cathode can and the adjacent surfaces of the catalyst electrode and polymeric seal, thus avoiding leakage of electrolyte along these boundary surfaces.

As an additional feature, the polymeric seal is designed with a sharp upper outer edge so that when the assembly of the anode can, polymeric seal and flexible catalyst electrode are pushed down into the cathode can, the upper edge of the catalyst electrode between the seal and the inner wall of the cathode can is automatically trimmed, exposing the current collector grid from the catalyst cathode to contact with the outer cathode can. In addition, the polymeric seal is also designed to have a broad inwardly extending convex curvature at its upper end, forming a shoulder to permit crimping of the upper edge portion of the wall of the cathode can against such convexly curved portion of the seal, and thereby lock the anode can assembly, the separator and catalyst electrode in position within the outer cathode can.

As a further feature, the wall of the anode can is provided with a flange or skirt portion as by forming an upwardly bent wall section, to receive a portion of the polymeric seal between the skirt and the adjacent wall portion of the anode can, to more firmly lock the seal onto the wall of the anode can and prevent any displacement thereof during the pressure operation for inserting the assembly including the anode can and the seal into the cathode can as noted above.

A still further feature is the reduction of hydrogen evolution to a minimum by use of amalgamated copper surfaces on the anode can.

By employing the above features, preferably together with other auxiliary features of construction pointed out in greater detail below, a metal-air button cell, particularly a zinc-air button cell, construction is provided which is particularly advantageous for use in hearing aids, and is substantially leak-proof, even when stored at temperatures of the order of about 50° C., and ambient relative humidity, over a 30 day period. Such storage, when followed by discharge of the device, shows very little effect on capacity.

The invention will be more clearly understood from the detailed description below of preferred embodiments of the invention, taken in connection with the accompanying drawing wherein:

FIG. 1 is a vertical section through a zinc-air button cell according to a preferred embodiment of the invention;

FIG. 2 is a top plan view of FIG. 1, partially broken away;

FIG. 3 is a vertical section through the assembly of the anode can and seal mounted thereon according to the invention;

Figure 6:
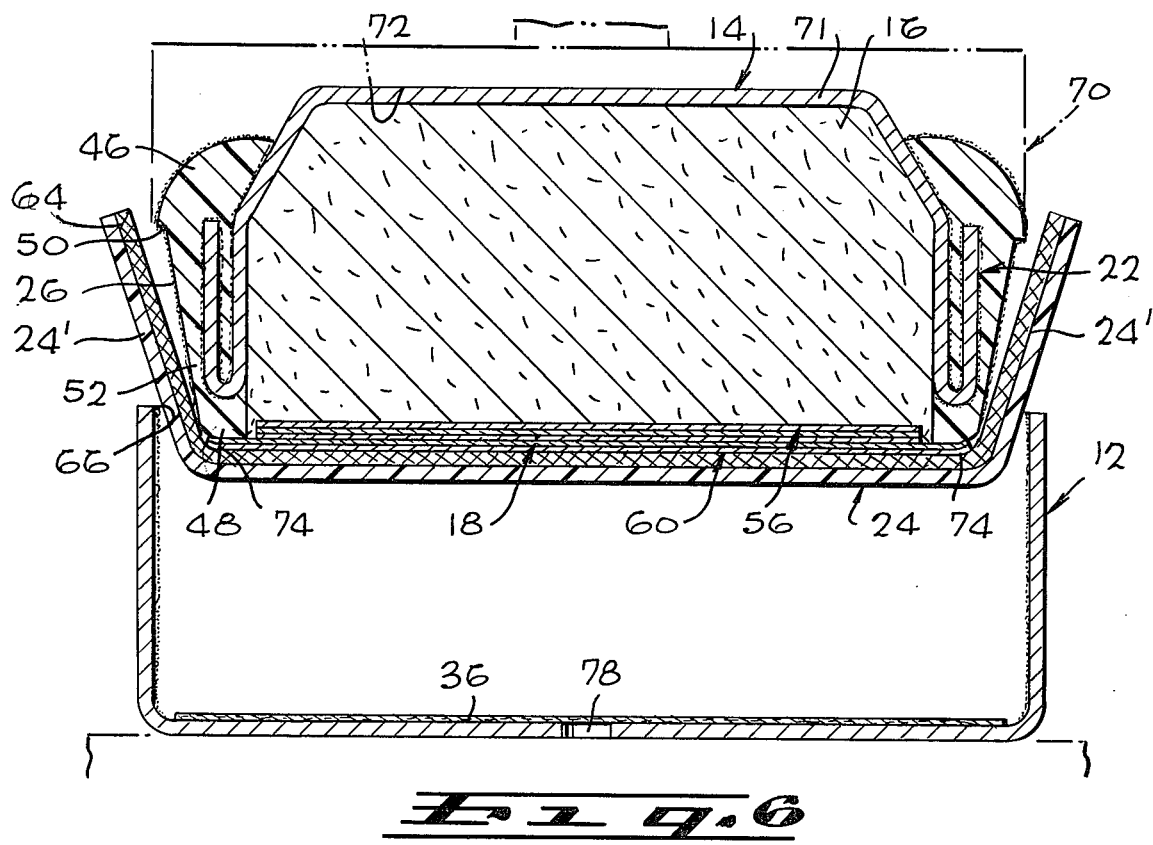
FIG. 6 illustrates initial insertion by pressure of the assembly of the inner anode can, separator arrangement and catalyst electrode components illustrated in FIG. 4, into the outer cathode can.
Figure 7:
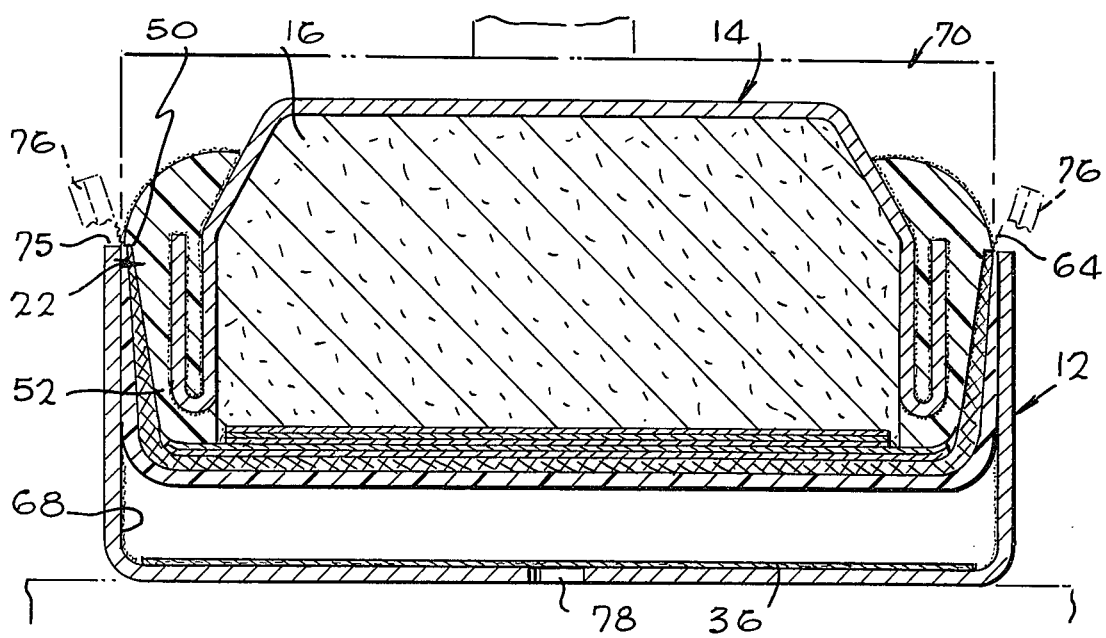

FIG. 7 is similar to FIG. 6 but illustrates the position of the components after further insertion of the anode can and associated components into the cathode can; and FIG. 8 is a partial section which illustrates the final position of the anode can and seal thereon, the separator arrangement and the catalyst electrode within the cathode can following complete insertion of these components into the outer cathode can.

Referring to FIGS. 1 and 2 of the drawing, there is shown a zinc-air button cell 10 according to the invention comprised of a cathode outer can 12, and an anode inner can 14 positioned within the cathode can 12. The anode and cathode cans are of cylindrical shape, but can be of any other shape such as spherical, square, and the like. The cathode can 12 can be nickel, nickel plated steel or stainless steel, and the anode can 14 is preferably copper clad stainless steel, which is amalgamated, but it will be understood that other suitably conductive metals or materials also can be used for both the anode and cathode cans. The anode can 14 contains zinc anode paste indicated at 16 which is maintained within the anode can by a separator assembly 18. The use of copper clad stainless steel anode cans allows pre-amalgamation of the cans. This inhibits hydrogen evolution and reduces it to a minimum. Positioned around the vertical side wall 20 and truncated wall 21 of the anode can 14 is a polymeric seal 22.

A flexible catalyst electrode indicated at 24 is positioned on the opposite side of the separator assembly 18 from the zinc anode paste 16 and extends upwardly along the outer side 26 of the seal 22. The flexible catalyst electrode 24 is preferably formed as a composite of a gas permeable flexible hydrophobic barrier or membrane 28, and a catalyst 29. The membrane 28 extends upwardly at 30 along the vertical inner wall 32 of the outer cathode can 12, and is pressed between such inner wall and the adjacent upwardly extending side of the seal 22. Positioned between the membrane 28 and the bottom 34 of the cathode can 12 is a blotting paper disc 36 which is pressed against the bottom of the cathode can by the membrane 28.

In the method of fabrication of the button cell illustrated in FIGS. 1 and 2, and referring first to FIG. 3 of the drawing, an anode can 14 is provided of generally cylindrical shape and having an upwardly extending vertical flange or skirt 38 which is bent upwardly at 40 and forms an integral portion of the side wall 20 of the can. The skirt 38 extends peripherally around the side wall 20 parallel thereto and is spaced therefrom to form an annular space 42. As an essential feature of the invention, an alkali, particularly KOH, resistant elastomer coating or adhesive is applied at 44 to the outer surface of the side wall 20 of the anode can 14, and to the truncated portion 21 thereof, and on the inner and outer surfaces of the skirt 38. For this purpose a pressure sensitive or elastomeric material or adhesive is required, which has the property of deforming or creeping under pressure without cracking and forming voids. Thus, such material "gives" as pressure is applied. The material should retain its resilient properties over an extended period without drying out or becoming brittle. Various solvent based elastomers are suitable for this purpose.

It has been found that a class of elastomers having the above advantageous properties are the lower alkyl elastomers comprising recurring carbon chains, preferably straight chains, ranging from about $C_3$ to $C_6$, and which are modified by phenolic resin. These elastomers are generally self curing. A self-curing butyl elastomer modified by phenolic resin has been found to be particularly effective. Other specific elastomers of this type which can be employed include, for example, propyl, pentyl or hexyl elastomers, modified by phenolic resin. Another suitable elastomer having the above properties are the tacky acrylic resins such as the material marketed as Bostik S-1-1167. Both of the above types of elastomers are pressure sensitive or elastomeric adhesives, which remain pressure sensitive even in the fully cured state. As previously noted, the cured above elastomers have rubber-like characteristics and remain relatively resilient over an extended period without becoming brittle.

The polymeric seal 22 is then molded around the side wall 20 of the anode can and around the attached shirt or flange 38, over the elastomer coating 44 thereon, the seal filling the annular space 42 between the skirt 38 and side wall 14. It is noted that the seal 22 has an inwardly convex or rounded upper shoulder portion 46 and extends downwardly to form a peripheral lower portion 48 below the upwardly bent portion 40 of the side wall 20. It will be noted also that the seal 22 has a sharp inwardly extending lip 50 at the lower extremity of the shoulder 46, and the seal then tapers downwardly from such sharp edge portion, as indicated at 52, to the lower end of the portion 48, for the purposes described in greater detail below.

The polymeric seal is formed of a resilient material, and is preferably molded of polypropylene, such as the material marketed as Hercules PRO-FAX, but can be formed of other compatible resilient alkylene polymers such as polyethylene. It has been found that polypropylene is particularly advantageous for use in combination with the above described pressure sensitive elastomeric adhesive coating, as at 44, to permit application of substantial pressure to the anode can 14, during assembly of the device, as described below, while at the same time permitting the elastomer coating to "give" or deform with respect to the adjacent wall 20 of the can 14 and the adjacent skirt or flange 38 without cracking. It is also noted that the molding of a portion of the seal 22 into the annular space 42 between the side wall 20 and the skirt 38 functions to lock the peripheral seal in position on the side wall of the anode can.

In preferred practice there is also applied to the outer surface of the seal 22, a coating 54 of the same type of elastomer, e.g. butyl elastomer modified by phenolic resin, as applied at 44 on the surfaces of the anode can side wall 20 and the attached flange or skirt 38.

Figure 4:
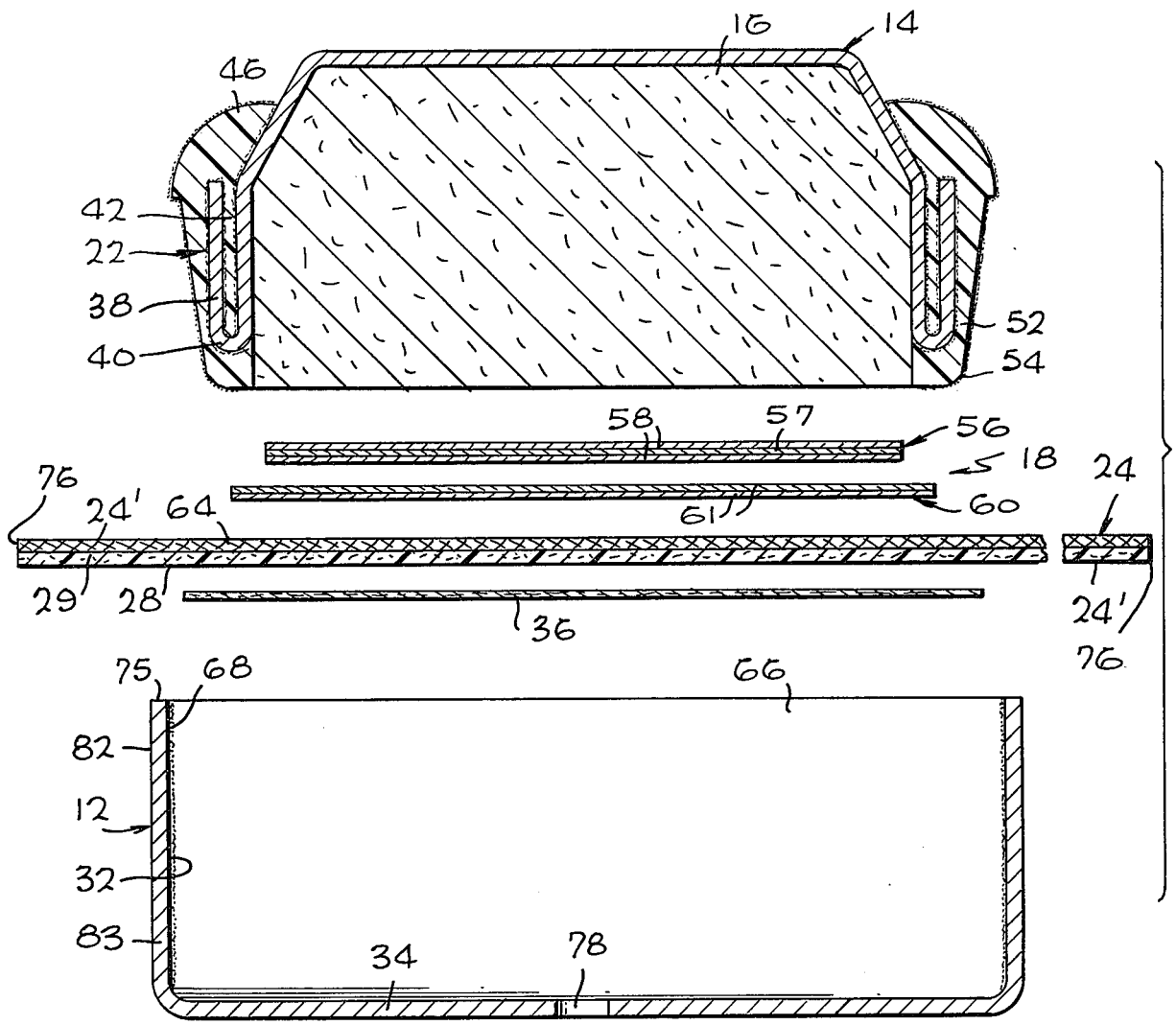
FIG. 4 is an exploded view of the components of the button cell of FIG. 1, prior to assembly thereof.

Referring now particularly to FIG. 4, the anode can 14 with the seal 22 thereon is then filled with the zinc anode paste 16. Such paste is prepared from a mixture of amalgamated zinc powder and a resin, particularly carboxypolymethylene, such as the material marketed as Carbopol. The carboxypolymethylene preferably employed functions as a gelling agent, resulting in the formation of a zinc paste, and provides increased protection against oxidation of the zinc. A specific zinc paste for this purpose can be formed from the zinc powder amalgamated to between 2 to 10%, preferably 5%, such amalgamated zinc powder then being mixed with Carbopol in an amount of 0.01–0.02 gram per 1 gram of zinc, and to which is added 0.2 to 0.3 cc of 33% KOH electrolyte per 1 gram of zinc.

A laminated separator 56, which preferably is comprised of a sheet 57 of a graft copolymer of acrylic acid on a low density polyethylene polymer sandwiched between a pair of cellophane sheets 58, (marketed as PERMION 3192 40/20), is then placed against the zinc anode paste 16, referring also to FIG. 6, closing the zinc paste compartment, and another organic separator 60 formed of a pair of laminated sheets 61, preferably consisting of a copolymer of vinyl chloride and acrylonitrile (marketed as Dynel), is positioned against the first laminated separator 56, the separator 60 being of a greater length than separator 56, for a reason noted hereinafter. It will be understood that any suitable type of separator or separators, preferably flexible, can be employed and that a single separator can be utilized rather than a plurality of separators. Total thickness of the separator or separators can range from about 0.015 to about 0.030 inch. However, it has been found that the use of the PERMION 3192 40/20 laminated separator 56 in combination with a second separator such as the above noted Dynel separator 60 provides increased protection against oxidation of the zinc anode 16. The combination of the laminated separators 56 and 60 constitute the separator assembly 18.

There is positioned against the lower surface of the second separator 60, a flexible catalyst electrode 24 which is comprised of a composite organic permeable flexible membrane 28, preferably a polytetrafluoroethylene membrane, containing a suitable catalyst 29 such as carbon and manganese dioxide distributed therein, and with a current collector 64 in the form of a metal mesh embedded therein. Thus, as an example, the catalyst is rolled onto a polytetrafluoroethylene (Teflon) film and open silver expanded mesh is used as the current collector. The Teflon membrane can then be pressed with a secondary Teflon film wrapper, the total thickness of the composite cathode element 24 being of the order of 0.015 to about 0.030 inch. The catalyst cathode element 24 is preferably substantially longer than the adjacent separator element 60.

A porous fibrous mat or blotting paper 36, e.g. in the form of a disk or filter paper or Dynel, is positioned below the catalyst cathode element 24 and adjacent the bottom of the cathode can 12, seen in FIG. 1.

The inside surface of the cathode can is coated at 68 with the same alkali or KOH resistant elastomer or pressure sensitive elastomeric adhesive, e.g. self-curing butyl elastomer modified by phenolic resin, as employed for the coating 44 applied to the outer surfaces of the anode can 14, and the coating 54 provided on the outer surfaces of the seal 22. The thickness of such elastomeric coatings can vary between about 0.0002 and 0.002 inch, but can be greater than 0.002 inch or less than 0.0002 inch, depending on the nature of the elastomer.

Figure 5:
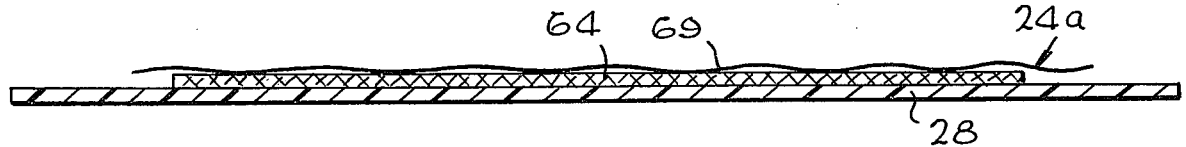
FIG. 5 is a modification of the catalyst electrode and current collector system illustrated in FIG. 4.

Referring to FIG. 5, it will be noted that the modified catalyst electrode assembly 24a can include, in addition to the expanded mesh current collector 64 embedded in the permeable membrane 28, a separate current collector wire, e.g. silver wire, 69 in contact with the mesh current collector 64.

Now referring particularly to FIG. 6, the assembly of cell parts 14, 56, 60 and 24 are vertically aligned over the upper opening 66 of the cathode can 12, as illustrated in FIG. 6, in a suitable jig or assembly tool shown in phantom lines, including a piston or plunger indicated at 70 in contact with the upper surface 71 of the anode can 14. The lower surface 72 of the plunger 70 should have a contour which matches the contours of the top 71 of the anode can and the adjacent curved shoulder 46 of the seal 22. It will be seen in FIG. 6 that the outer end portions 74 of the second separator member 60 are disposed against the lower surface 48 of the seal 22. Also it will be noted that the outer end portions 24' of the catalyst electrode composite 24 are bent around the outer end portions 74 of the separator 60 and around the lower end portion 48 of seal 22, and extend upwardly a distance slightly less than the height of the cathode can 12, for reasons which will be apparent hereinafter.

From the position of the assembly noted in FIG. 6, pressure is applied by the plunger 70, sufficient to slowly push the anode can 14, the separator assembly 18 and the flexible catalyst electrode 24 into the cathode can 12, to the intermediate position illustrated in FIG. 7. Such pressures can range from about 1,000 to about 5,000 lbs. per square inch, preferably between about 1,000 and about 2,500 lbs. per square inch. During this period it will be seen that the long downwardly tapered wall 52 of the seal 22 progressively increases the pressure on and compresses the catalyst cathode electrode 24 against the inner surface of the cathode can 12, so that particularly at the top of the tapered wall 52 of the seal, the end portions 24' of the catalyst electrode are tightly sealed between the outside surface of the seal 22 and the inside surface of the cathode can 12. In addition, the tapered wall of the seal 22 in contact with the catalyst electrode 24 provides a large sealing area between the seal and the wall of the outer cathode can. When the assembly of the anode can 14, the separator assembly 18 and the catalyst electrode 24 reaches the position illustrated in FIG. 7, at which point the sharp upper edge 50 of the seal 22 contacts the upper edge 75 of the wall of the cathode can 12 and then commences to enter the cathode can, such edge 50 supported by plunger 70 cuts and automatically trims the extreme outwardly extending end portions 76 of the catalyst electrode 24, exposing the current collector 64 to contact with the inner upper surface of cathode can 12. Trapped air in the cathode can 12 escapes through the central hole 78 provided in the bottom of the cathode can 12.

As previously noted, the tapered seal 22 progressively increases pressure along the vertical inner wall 32 of the cathode can 12, and during this period of downward movement of the tapered seal 22 and associated anode can 14, separator assembly 18 and catalyst electrode 24, into the bottom of the cathode can 12, the pressure sensitive elastomer or elastomeric adhesive coatings 44 between seal 22 and the anode can 14, 54 on the outer surface of the seal 22, and 68 on the inside surface of the vertical wall 32 of cathode can 12, form leak-proof seals. Since the above described elastomer of which the above noted coatings are formed has the ability of deforming or creaping under pressure as the anode can, separator and catalyst electrode assembly are pushed into the cathode can 12, substantially no cracks or voids are formed in such coatings, and such coatings form effective continuous seals. The elastomeric coating 44 on the exterior surfaces of the anode can 14, provided prior to the molding of the seal 22, particularly affords an elastic film which permits differential expansion of the plastic seal and the metal anode can, without breaking the bond between these adjacent surfaces.

As pressure is continued to be applied by the plunger 70 to the assembly as illustrated in FIG. 7, and such assembly is pushed farther down into the cathode can 12, the assembly of the anode can 14, separator assembly 18 and catalyst electrode 24 reach their lowermost position in the cathode can 12, with the catalyst electrode membrane 62 in contact with the blotting paper 36 on the bottom of the cathode can 12. This position is illustrated in FIG. 8. It will be noted in FIG. 8 that all of the sealing elements including the seal 22, the separator elements 56 and 60, and the catalyst electrode assembly 24 are in tight sealing engagement and together with the above noted elastomeric coatings 44, 54 and 68 provide an effective seal against leakage of electrolyte contained in the separators 56 and 60 and in contact with the catalyst electrode assembly 24, between the anode can 14 and the cathode can 12, out of the cell. To provide most effective sealing, the thickness of the separator assembly 18 and the catalyst electrode assembly 24 should be maintained relatively thin.

Downward movement of the anode can 14 and its associated elements 18 and 24 into the cathode can 12, from the position illustrated in FIG. 6, to the positions illustrated in FIGS. 7 and 8, is preferably carried out in a single progressive motion, with automatic trimming of the outwardly extending portions 76 of the catalyst electrode 24, as seen in FIG. 7. When such assembly is properly seated in its final position within the cathode can 12 as seen in FIG. 8, the plunger 70 is retracted and an outwardly extending portion 80 of a crimping tool 81 makes contact with the upper edge portion 82 of the vertical wall 83 of cathode can 12, and upon further downward compressive movement of the crimping tool 80 against such upper edge portion 82, crimps such upper edge portion downwardly to form a crimped upper edge portion 84 (see also FIG. 1) against the upper shoulder 46 of seal 22, the crimped edge portion 84 having a rounded contour substantially matching the curvature of the shoulder 46 of the seal 22. The crimped edge portion 84 is pushed down against the upper shoulder of the seal 22 with sufficient pressure to essentially embed such crimped edge portion 84 into the seal, with the outer edge 86 of the crimped edge portion 84 spaced from the adjacent truncated wall 21 of anode can 14, by a peripheral bead 88 (see FIG. 1) of the seal 22 thus formed by the pressure of the crimping operation.

The resulting button cell 10 thus produced according to the invention, can be sealed from ambient air for storage purposes by placement of masking tape or similar impervious sheet material as indicated in phantom at 90 in FIG. 1, against the bottom of the cathode can 12 and over the hole 78 in the bottom of the cathode can. The masking tape or similar sheet material 90 is removed to place the cell in operation. In the operation of such zinc-air button cell, air entering through the hole 78 diffuses through the blotting paper 36 and into contact with the catalyst electrode 24 and the catalyst thereon. At the catalyst electrode oxygen is reduced and simultaneously the zinc of zinc electrode at 16 is oxidized to zinc oxide, and hydroxyl ions are transported through the separator assembly 18 to generate a current. For this purpose suitable electrolyte solutions, e.g. an aqueous potassium hydroxide solution, is introduced into the anode paste 16 for passage into the separator assembly, or such separator assembly initially can be impregnated with such electrolyte solution.

It will be understood that suitable anodic electrode materials other than zinc can be employed, such as cadmium, and suitable cathodic electrode materials other than the above noted carbon and magnanese dioxide can be employed, such as activated silverized graphite. Accordingly, although the present invention is concerned particularly with zinc-air cells, the sealing principles of the invention are also applicable to other metal-air cells, e.g. cadmium-air cells.

The number and diameter of air access holes such as 78 can be tailored to give any desired current drain. Thus for example low rate zinc-air button cells according to the invention had an open stand life of 16 to 20 weeks while cells according to the invention having a higher rate of 150 mA (milliamps) when exposed to air, lasted 2 to 3 weeks.

During storage of the button cells according to the invention, it was found that hydrogen evolution is so minimal that there is substantially no pressure buildup even when the cell is sealed completely.

There is accordingly provided according to the invention, improved leak-proof cells, particularly zinc-air button cells especially designed for use in hearing aids, having a number of features and advantages. The invention cells embody as an essential feature the use of certain solvent based alkali resistant elastomers or elastomeric adhesives as thin coatings along substantially all sealing surfaces between the anode and cathode cans, and which are pressure sensitive to form a bond between the respective metal cans and a sealing element when the cell is finally assembled and finally crimped. The nature of such coatings is such that they do not crack or form voids when subjected to the pressure of assembly of the components, and tend to deform or creap as pressure is applied. In addition, by employing in combination with such pressure sensitive coatings a seal between the anode and cathode cans, such seal being of a tapered design which provides a long and large sealing area and which progressively increases pressure along such sealing area, to aid in locking the anode assembly, separator and catalyst electrode elements into the cathode can, a highly effective leak-proof assembly is readily provided.

Other features include reduction of hydrogen evolution to a minimum by use of an amalgamated copper clad stainless steel anode can. This permits use of a very simple means for sealing the cell during storage by blocking the vent hole with masking tape. By using a jelled zinc anode paste and Permion separator of the type noted above, the life of the cell during active stand is substantially extended. The use of an air activated catalyst cathode, and which is of relatively low cost, allows for greater volumetric energy density (capacity).

While particular embodiments of the invention have been described for purposes of illustration within the spirit of the invention, it will be understood that the invention is not to be taken as limited except by the scope of the appended claims.

What is claimed is:

1. A metal-air cell which comprises an outer metal can and an inner metal can disposed within said outer metal can, said inner can containing electrode material, a downwardly tapered polymeric seal between the outer wall of said inner can and the inner wall of said outer can, a catalyst electrode positioned between said seal and the inner wall of said outer can, a separator between said electrode material and said catalyst electrode, and a pressure sensitive coating on the outer wall of said inner can and disposed between said outer wall and said seal, said pressure sensitive coating being an alkali resistant elastomer characterized by an ability to creep under pressure substantially without cracking or forming voids, and providing a substantially continuous seal, said elastomer coating forming an elastic film having rubber-like characteristics and remaining resilient.

2. A metal-air cell as defined in claim 1, said seal being an alkylene polymer selected from the group consisting of polyethylene and polypropylene.

3. A metal-air cell as defined in claim 1, said elastomer coating being a pressure sensitive adhesive.

4. A metal-air cell as defined in claim 1, said elastomer coating being selected from the group consisting of (1) a self-curing lower alkyl elastomer comprising recurring carbon chains ranging form $C_3$ to $C_6$, modified by phenolic resin, and (2) a tacky acrylic resin.

5. A metal-air cell as defined in claim 2, said seal being a polypropylene seal and said elastomer coating being a self-curring butyl elastomer modified by phenolic resin.

6. A metal-air cell as defined in claim 1, including a coating of said elastomer on said seal and on the inner surface of said outer can in contact with said catalyst electrode.

7. A metal-air cell as defined in claim 1, said elastomer coating being a self-curing lower alkyl elastomer comprising recurring carbon chains ranging from $C_3$ to $C_6$, modified by phenolic resin.

8. A metal-air cell as defined in claim 1, said inner anode can having an amalgamted copper-containing surface.

9. A metal-air cell as defined in claim 1, said downwardly tapered seal having a long outer sealing surface and and progressively increasing pressure along said surface and compressing said catalyst electrode between said seal and the inner wall of said outer can.

10. A zinc-air button cell which comprises an outer metal cathode can and an inner metal anode can disposed within said outer metal can, said inner can containing zinc electrode material, a downwardly tapered seal between the outer wall of said inner can and the inner wall of said outer can, said seal being a resilient alkylene polymer selected from the group consisting of polyethylene and polypropylene, a catalyst electrode positioned between said seal and the inner wall of said outer can, a separator between the zinc electrode material and said catalyst electrode, and a pressure sensitive coating on the outer wall of said inner can and disposed between said outer wall and said seal, said pressure sensitive coating being a KOH resistant solvent based elastomer characterized by an ability to creep under pressure substantially without cracking or forming voids, and providing a substantially continuous seal and a substantially leak-proof cell construction, said elastomer coating forming an elastic film having rubber-like characteristics and remaining resilient.

11. A zinc-air button cell as defined in claim 10, said seal being a polypropylene seal, and said elastomer coating being selected from the group consisting of (1) a self curing butyl elastomer modified by phenolic resin, and (2) a tacky acrylic resin.

12. A zinc-air button cell as defined in claim 11, including a coating of said elastomer on said seal and on the inner surface of said outer can in contact with said catalyst electrode.

13. A zinc-air button cell as defined in claim 10, said downwardly tapered seal having a long outer sealing surface and and progressively increasing pressure along said surface and compressing said catalyst electrode between said seal and the inner wall of said outer can, and wherein said anode can is a copper clad stainless steel can having the copper surface amalgamated.

14. A zinc-air button cell as defined in claim 12, said downwardly tapered seal having a long outer sealing surface and and progressively increasing pressure along said surface and compressing said catalyst electrode between said seal and the inner wall of said outer can, said seal having a convex curvature at its upper end, the upper edge portion of the wall of said outer can being crimped against said upper curved portion of said seal.

15. A zinc-air button cell as defined in claim 10, said zinc electrode material being a zinc anode paste containing carboxypolyethylene as gelling agent, said catalyst electrode comprised of a composite of an organic permeable flexible membrane, a catalyst and a metal mesh current collector.

16. A zinc-air button cell as defined in claim 14, said zinc electrode material being a zinc anode paste containing carboxypolymethylene as gelling agent, said catalyst electrode comprised of a composite of an organic permeable flexible membrane, a catalyst and a metal mesh current collector, said seal having a sharp upper outer edge for trimming the upper edge portion of said composite and exposing said current collector to contact with the inner wall of said outer cathode can.

17. A zinc-air button cell as defined in claim 15, said organic flexible membrane being polytetrafluoroethylene.

18. A zinc-air button cell as defined in claim 15, said separator comprising a pair of separator elements, at least one of which is a copolymer of vinyl chloride and acrylonitrile.

19. A zinc-air button cell as defined in claim 15, said separator comprising a pair of separator elements, at least one of which comprises a graft copolymer of acrylic acid on a low density polyethylene polymer.

20. A zinc-air button cell as defined in claim 15, including a porous fibrous mat positioned below said catalyst electrode on the bottom of said cathode can, the bottom of said cathode can being apertured and open to the atmosphere.

21. A zinc-air button cell as defined in claim 10, said anode can containing an upwardly extending integral flange spaced from the wall of said can, said seal extending into the space between said flange and the wall of said anode can and extending around said flange, said elastomer coating being applied to the surfaes of said flange in contact with said seal.

22. A zinc-air button cell as defined in claim 10, wherein said anode can is a copper clad stainless steel can having the copper surface amalgamated.

23. A zinc-air button cell which is substantially leak-proof, comprising an outer metal cathode can and an inner metal anode can, said anode can having an outer diameter smaller than the inner diameter of said cathode can, said anode and cathode cans having substantially vertical sidewalls, said anode can having an upwardly bent skirt portion extending vertically around said anode can and spaced from the vertical outer wall thereof, a first elastomeric adhesive coating selected from the group consisting of (1) a self-curing butyl elastomer modified by phenolic resin and (2) a tacky acrylic resin on the outer wall of said inner can and on the surfaces of said skirt portion, said elastomeric coating being KOH resistant and characterized by an ability to deform or creap under pressure substantially without cracking or forming voids, a polypropylene seal positioned over said elastomeric coating around said skirt portion and in the annular space between said skirt portion and the adjacent vertical wall of said anode can, a second elastomeric adhesive coating as above defined applied to the outer surface of said polypropylene seal, zinc anode paste in said anode can, said paste containing carboxypolymethylene as gelling agent, a first separator member comprised of sheets of a composite of cellophane a grafted copolymer of acrylic acid on polyethylene, said first separator being in contact with said anode paste in said anode can, a second separator member comprised of composite sheets of a copolymer of vinyl chloride and acrylontrile, said second separator member being in contact with said first separator member and extending outwardly into engagement with the lower surface of said seal, a catalyst electrode positioned in contact with said second separator member and extending outwardly therefrom, said catalyst electrode comprising a composite of a polytetrafluoroethylene membrane, a catalyst distributed therein and a metal mesh current collector, the outer edge portions of said catalyst electrode extending upwardly between said seal and the inner surface of said outer cathode can, a third elastomeric adhesive coating as above defined on the vertical inner surface of said cathode can in contact with said catalyst electrode, said seal having a long outer sealing surface and being tapered downwardly and progressively increasing pressure along said surface and compressing said catalyst electrode between said seal and the inner wall of said outer cathode can, said seal having a sharp lip for trimming the upper outer edge of said composite catalyst electrode and exposing said current collector to contact with the inner wall of said outer cathode can, said seal having a convex curvature at its upper end, the upper edge portion of the wall of said outer can being crimped against said upper portion of said seal.

24. A zinc-air button cell as defined in claim 23, including a blotting paper positioned below said catalyst electrode on the bottom of said cathode can, the bottom of said cathode can being apertured to admit air into sid cathode can.

25. A process for fabricating a metal-air cell which comprises assembling an inner metal can containing an electrode material and having a downwardly taperred a polymeric seal molded around the outer wall of said inner can, an elastomer coating on the outerwall of said inner can between said wall and said seal, said elastomer coating being an alkali resistant elastomer characterized by an ability to creep under pressure substantially without cracking or forming voids, said elastomer coating forming an elastic film having rubber-like characteristics and remaining resilient, a separator in contact with said anode material in said innercan, and a flexible catalyst electrode positioned in contact with said separator and extending outwardly therefrom, said assembly being positioned adjacent the upper open end of an outer metal can, pressing said assembly under substantial pressure downwardly into said metal can with the outer edge portions of said catalyst electrode pressed between the inner surface of the wall of said outer can and said seal, until said assembly is positioned adjacent the bottom of said outer can, and crimping the upper edge portion of said outer can over the upper surface of said seal.

26. A process as defined in claim 25, wherein said seal downwardly tapered sea is an elastomeric polypropylene seal having a long outer sealing surface and progressively increasing pressure along said surface and compressing said catalyst electrode between said seal and the inner wall of said outer can during said pressing of said assembly downwardly into said outer can.

27. A process as defined in claim 25, wherein said elastomer coating is selected from the group consisting of (1) a self-curing lower alkyl elastomer comprising recurring carbo chains ranging from $C_3$ to $C_6$, modified by phenolic resin, and (2) a tacky acrylic resin.

28. A process as defined in claim 25 wherein said seal has a sharp upper outer edge, and including trimming the upper outer edge of said catalyst electrode when said sharp upper edge makes contact with said catalyst electrode against the inner wall of said outer can, and exposing the current collector of said catalyst electrode to contact with the inner wall of said outer cathode can, and wherein said seal has a convex curvature at its upper end portion, said crimping of the upper edge portion of the wall of said outer can taking place against said upper curved portion of said seal.

29. A process as defined in claim 28, wherein the outer surface of said seal and the inner surface of said outer can also have applied thereto said alkali resistant elastomer coating.

* * * * *